US011428675B2

(12) United States Patent
Jones et al.

(10) Patent No.: US 11,428,675 B2
(45) Date of Patent: Aug. 30, 2022

(54) LIQUID CHROMATOGRAPHY ANALYTE REACTION AND ANALYSIS SYSTEM

(71) Applicant: Activated Research Company, LLC, Eden Prairie, MN (US)

(72) Inventors: Andrew Jones, Minneapolis, MN (US); Tommy Saunders, St. Louis Park, MN (US); Mike Hofflander, Edina, MN (US)

(73) Assignee: Activated Research Company, LLC, Eden Prairie, MN (US)

( * ) Notice: Subject to any disclaimer, the term of this patent is extended or adjusted under 35 U.S.C. 154(b) by 146 days.

(21) Appl. No.: 16/524,269

(22) Filed: Jul. 29, 2019

(65) Prior Publication Data

US 2020/0033306 A1     Jan. 30, 2020

Related U.S. Application Data

(60) Provisional application No. 62/818,746, filed on Mar. 15, 2019, provisional application No. 62/711,605, filed on Jul. 29, 2018.

(51) Int. Cl.
*G01N 30/64* (2006.01)
*G01N 30/38* (2006.01)
(Continued)

(52) U.S. Cl.
CPC ............. *G01N 30/64* (2013.01); *G01N 30/38* (2013.01); *G01N 2030/027* (2013.01);
(Continued)

(58) Field of Classification Search
CPC .. G01N 30/38; G01N 30/64; G01N 2030/027; G01N 2030/347;
(Continued)

(56) References Cited

U.S. PATENT DOCUMENTS 3,732,982 A     5/1973   Dunnill et al.
3,744,973 A *   7/1973   Dubsky .................. G01N 30/68
                                                                           422/54
(Continued)

FOREIGN PATENT DOCUMENTS

EP      2 089 128 A1    8/2009
EP      2 089 128 A4    4/2013
(Continued)

OTHER PUBLICATIONS

Arthur Karmen (1967), Quantitative Analysis by Liquid Chromatography, Separation Science, 2:3, 387-397, DOI: 10.1080/01496396708049708.
(Continued)

*Primary Examiner* — Justin N Olamit
(74) *Attorney, Agent, or Firm* — E. Joseph Gess; Merchant & Gould PC (57) ABSTRACT

In the present system and method, a conduit from a LC device continuously transports solvent, buffers, and analytes to the inlet of a solvent removal and analyte conversion device which evaporates the solvents, leaving non-volatile analytes for detection. The device comprises a rotating disk. The liquid chromatograph device can be any device using liquid chromatography to separate molecules. The solvents in the LC effluent can include, but are not limited to, water, methanol, acetonitrile, tetrahydrofuran, and acetone. After removal of the volatile components, the non-volatile analytes are converted with a concentrated energy source so that they may be detectable.

17 Claims, 4 Drawing Sheets

(51) Int. Cl.
  *G01N 30/34* (2006.01)
  *G01N 30/02* (2006.01)
  *G01N 30/84* (2006.01)
(52) U.S. Cl.
  CPC .......... *G01N 2030/347* (2013.01); *G01N 2030/8417* (2013.01); *G01N 2030/8447* (2013.01); *G01N 2030/8494* (2013.01)
(58) Field of Classification Search
  CPC ... G01N 2030/8417; G01N 2030/8447; G01N 2030/8476; G01N 2030/8494
  See application file for complete search history.

(56) References Cited

U.S. PATENT DOCUMENTS

| | | | |
|---|---|---|---|
| 3,788,479 A | | 1/1974 | Szakasits |
| 4,215,090 A | | 7/1980 | Dixon |
| 4,271,022 A | * | 6/1981 | Dixon .................... G01N 30/68 210/198.2 |
| 4,696,187 A | * | 9/1987 | Kopp .................... G01N 30/91 210/198.3 |
| 4,843,243 A | * | 6/1989 | Biemann ................ G01N 30/74 250/288 |
| 4,968,885 A | | 11/1990 | Willoughby |
| 5,039,614 A | * | 8/1991 | Dekmezian ........... B01J 20/291 436/43 |
| 5,736,741 A | * | 4/1998 | Bertsch ............... H01J 49/0404 250/288 |
| 8,695,813 B2 | | 4/2014 | Carson et al. |
| 8,920,658 B2 | | 12/2014 | Carson et al. |
| 2002/0060288 A1 | | 5/2002 | Hughey et al. |
| 2011/0064616 A1 | * | 3/2011 | Zelechonok ........... G01N 21/03 422/70 |
| 2017/0146496 A1 | * | 5/2017 | Jones .................... G01N 30/84 |

FOREIGN PATENT DOCUMENTS

| | | |
|---|---|---|
| WO | 02/18939 A2 | 3/2002 |
| WO | 2008/073361 A1 | 6/2008 |

OTHER PUBLICATIONS

H. Dubsky, A Disc Detector for Liquid Chromatography, Journal of Chromatography, 71 (1972) pp. 395-403.

B. Lapidus, A. Karmen, An Efficient Flame Ionization Detection System for Liquid Chromatography, Journal of Chromatographic Science, vol. 10, pp. 103-106, Feb. 1972.

O. S. Privett and W. L. Erdahl, An Improved Flame Ionization Detector for High Performance Liquid Chromatography, Analytical Biochemistry 84, pp. 449-461 (1978).

C. L. Guillemin, J. L. Millet, and J. Dubois, Thermal Aqueous Liquid Chromatography—The TALC Technique, Journal of High Resolution Chromatography & Chromatography Communications, vol. 4, pp. 280-286, Jun. 1981.

David J. Miller and Steven B. Hawthorne, Subcritical Water Chromatography with Flame Ionization Detection, Analytical Chemistry, vol. 69, No. 4, pp. 623-627, Feb. 15, 1997.

E. Young, R. Smith, B. Sharp, J. Bone, Liquid chromatography-flame ionisation detection using a nebuliser/spray chamber interface. Part 2. Comparison of functional group responses, Journal of Chromatography A, 1236 (2012) pp. 21-27.

International Search Report and Written Opinion issued in related International Patent Application No. PCT/US19/43939, dated Oct. 25, 2019.

Extended European Search Report issued in corresponding European Patent Application No. 19844475.4, dated Mar. 17, 2022.

* cited by examiner

LIQUID CHROMATOGRAPHY ANALYTE REACTION AND ANALYSIS SYSTEM

CROSS REFERENCE TO RELATED APPLICATIONS

The present application claims priority to U.S. Provisional Application No. 62/711,605 filed Jul. 29, 2018 and U.S. Provisional Application No. 62/818,746 filed Mar. 15, 2019, the complete disclosures of which are incorporated herein by reference in their entirety.

STATEMENT OF FEDERALLY SPONSORED RESEARCH OR DEVELOPMENT

This invention was made with Government support under 1853063 awarded by the National Science Foundation. The Government has certain rights in this invention.

BACKGROUND OF THE INVENTION

Liquid chromatography (LC) is a chemical analysis technique to separate and detect volatile and non-volatile molecules. Molecules are separated chromatographically based upon their affinities to a stationary phase which is contained in an LC column, and to a mobile phase or solvent, such as water, methanol, or acetonitrile. There are a variety of different detectors for LC effluents based upon different operating principles including, but not limited to, refractive index (RI), ultraviolet-visible light (UV-VIS), evaporative light-scattering (ELSD), and mass spectrometry (MS). These detectors all have inherent advantages and limitations. Refractive index detectors are simple to use but suffer from low sensitivities, small dynamic range, and baseline drifts with solvent gradients. Compounds without suitable chromophores cannot be detected via UV-VIS, but it is a robust and sensitive detector for certain compounds. Mass spectrometry can be very sensitive to a wide variety of molecules, operating well as a qualitative detector, but it can be highly sensitive to solvents and buffers, and requires extensive calibration for accurate quantification. A universal detector that is agnostic to mobile phases, gradients, molecule type, and has a large linear dynamic range would be of great value to the industry. Such a device would improve the universality of detection and sensitivity to solvents and permit the use of new solvents and gradient methods.

An important aspect of the detector system is the ability to effectively remove a variety of mobile phases and leave behind non-volatile analytes. There is prior art where the mobile phase has been evaporated from a moving substrate and analytes are carried into a heated zone to be volatilized by evaporation, and subsequently reacted by pyrolysis, oxidation, or cracking reactions. Designs include moving belts (Privett, O. S.; Erdahl, W. L., Anal. Biochem. 1978, 84:449), wires (Lapidus, B. M.; Karmen, A., J. Chromatogr. Sci. 1972, 10:103-106), chains (Karmen, A., J. Sep. Sci. 1967, 2:387-397), and rotating disks (Dubsky, H., J. Chromatogr. 1972, 71:395-399; U.S. Pat. No. 3,788,479A). These methods suffered from poor sensitivities, variable response, safety concerns, and frequent maintenance and cleaning due to incomplete combustion of analytes and instrument design. Specifically, incomplete combustion of analytes often led to deposits that reduced the detector response and necessitated frequent cleaning/maintenance of the substrate. Problems existed due to background noise from the surrounding environment and safety concerns due to evaporating flammable and hazardous solvents, especially nearby an open flame. Furthermore, only a fraction of the analytes entered the detector, reducing sensitivities and skewing the detector signal.

Commercially, the Pye Unicam Ltd LC/FID systems were available from 1968-1974, however, they were discontinued due to issues with sensitivity and reliability. Additionally, there are methods for detection with an FID (flame ionization detector) using LC exclusively with water as a mobile phase, as it does not contribute to the FID response. This has been done using a direct column connection to the FID (Guillemin, C. L.; Millet, J. L.; Dubois, J., J. High Resolut. Chromatogr. 1981, 4:280; Miller, D. J.; Hawthorne, S. B., Anal. Chem. 1997, 69:623-627) and nebulizers (Young, E.; Smith, R. M.; Sharp, B. L.; Bone, J. R., J. Chrom. A, 2012, 1236:16-20; WO2002018939A2; U.S. Pat. No. 8,920, 658B2; U.S. Pat. No. 8,695,813B2; EP2089128A4; EP2089128A1).

Under U.S. Patent Publication No. US20170146496A1, Activated Research Company has described the use of a catalytic reactor to perform oxidation reactions on organic analytes from an LC stream to produce CO or $CO_2$ to be subsequently reduced catalytically.

A system offering improved and efficient analysis of liquid chromatography effluents, regardless of the detector employed, would be greatly welcome to the industry.

SUMMARY OF THE INVENTION

In the present system, volatile molecules are removed from a liquid chromatograph (LC) effluent stream, and non-volatile molecules are converted for the purpose of chemical detection and/or quantification. The non-volatile molecules are converted for detection using a concentrated energy source. Reactions generally convert the organic compounds present in the LC effluent to molecules that are subsequently detectable by a suitable integrated detector, such as a flame ionization detector.

The present system and method allows the efficient and accurate detection and quantification of organic molecules received from a liquid chromatograph for the purpose of universal detection of non-volatile organic molecules. The linear dynamic range and carbon-specific response of the present invention are greater than those previously available.

The present system comprises a device that removes the solvent or mobile phase from a LC effluent stream or of an effluent stream of a related device and converts the remaining analytes of interest for analysis using a concentrated energy source. This device allows the system to operate efficiently and effectively in the analysis of an effluent from any liquid chromatograph device in concert with any desired/required detector. The device removes any volatile solvent and converts the remaining, non-volatile analytes appropriately.

In one embodiment, the present system is for the detection and quantification of organic molecules from a liquid chromatograph and comprises a liquid chromatograph having an outlet; a device comprising a heated rotating disk, an inlet for effluent from the liquid chromatograph with the inlet depositing the effluent onto the disk, a solvent vent for capturing volatilized gases, an inlet for gases such as air or hydrogen, a source of concentrated energy, and a vent for receiving transformed analyte from action of the concentrated energy; a conduit connecting the outlet of the chromatograph with the inlet on the device for receiving effluent from the chromatograph; a detector for detecting and quantifying organic molecules, the detector having an inlet; and a conduit connecting the vent in the device for receiving transformed analyte to the inlet of the detector.

In another embodiment, provided is a method for the detection and quantification of organic molecules utilizing the system noted above. The method comprises providing an effluent from a liquid chromatograph; depositing the effluent on a heated rotating disk; volatizing gases from the effluent and leaving behind non-volatilized analytes; moving the analytes on the disk by rotation to a station comprising a source of concentrated energy which acts on the analytes to convert the analytes to a detectable form; and passing converted analytes to a detector for detection and quantification.

DETAILED DESCRIPTION

In the present system and method, a conduit from a liquid chromatograph (LC) device continuously transports solvent, buffers, and analytes to the inlet of a solvent removal and analyte conversion device of the present invention, which evaporates the solvents, leaving non-volatile analytes for detection. The liquid chromatograph device can be any device using liquid chromatography to separate molecules. This can include, but is not limited to high pressure liquid chromatography, ultra-high pressure liquid chromatography, size exclusion chromatography, supercritical fluid chromatography, capillary electrophoresis, and gel permeation chromatography. The solvents in the LC effluent can include, but are not limited to, water, methanol, acetonitrile, tetrahydrofuran, acetone, and combinations thereof.

The inlet of the device is a spray nozzle that provides a continuous flow into the cell directed onto a substrate with minimal band broadening or axial dispersion. In general, the liquid spray nozzle forces the liquid into a steady stream. In one embodiment, the inner diameter of the spray nozzle ranges from 1-100 μm. The spray can also be gas assisted. The gas can also be introduced into the device to aid in the conversion and/or transport of molecules. The flow is deposited onto a rotating disk substrate, which may contain a groove for concentrating the analytes. The disk may be metal, ceramic, polymer-based, or another inorganic material, and may be coated or treated. The disk material and/or coating is selected to improve liquid deposition, evaporation of the solvent, and conversion of non-volatile analytes. In one embodiment, the disk is coated for enhanced energy absorbance and liquid deposition. The coating can have porosity. The disk may be wholly a single material, or inlays of dissimilar materials can be used.

The device is ideally sealed from the outside environment and pressurized. Cell pressure and gas phase flow rates are regulated to control the flow dynamics, including evacuating the evaporated solvent and sending the remaining analytes to the installed detector. Additionally, sealing ensures no contamination of the detector signal from the environment. The sealing can be done with suitable metal, rubber or polymer seals, which can employ spring energy components to supply a uniform applied force. Heating of the device facilitates solvent evaporation, and a thermal gradient is created at the inlet site to improve sample deposition characteristics.

After removal of the volatile components, the non-volatile analytes are converted with a concentrated energy source so that they may be detectable. The rotation of the disk brings the analytes not volatilized to the concentrated energy source. The treatment of molecules with a concentrated energy source can lead to ablation, combustion, pyrolysis, or ionization depending on the type/mode and amplitude of the energy. The energy source can be provided by a laser, electrical source, microwave source, plasma source, concentrated light, or another device for producing concentrated energy. It has been found that an infrared laser provides a concentrated energy source that leads to rapid and complete combustion of a variety of organic molecules on various substrates in air and greatly improves the performance of the detector compared with prior art. Materials of construction are chosen to localize and concentrate the applied energy source to the analyte conversion site. Conversions may be improved or directed by catalysts contained on the substrate of the disk. Theses catalysts may include, but are not limited to Ru, Ni, Pd, Pt, Co, Rh, Fe, Ir, and/or Cu. The converted species are analyzed by a suitable detector or reacted further to permit subsequent detection. Various detectors can be used to analyze the resulting compounds, including a mass spectrometer, flame ionization detector (FID), or light based detectors (e.g., infrared, ultraviolet, etc.).

Converted non-volatiles may be further reacted in an FID with a catalytic oxidation and/or reduction reactor(s) contained in a 3D-printed FID jet to convert molecules to methane, or another reaction/detection system. When using an FID, this secondary reaction to methane is done to improve the FID response. Compounds such as $CO_2$ will not respond in an FID, but methane gives a high and compound independent response, which is a requirement for universal detection.

Solvents and volatile species are transported out of the cell and can be detected separately, although potentially using the same detectors. Chromatography can be used to separate the solvents and volatile analytes.

The understanding of specific embodiments and their advantages will be improved with reference to the more detailed descriptions of the embodiments in connection with the accompanying figures.

Figure 1:
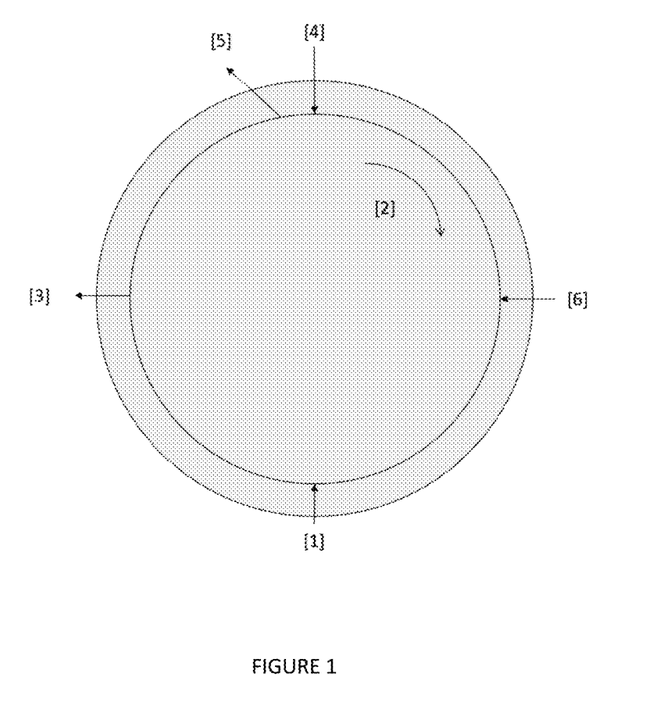
FIG. 1 shows one embodiment of the solvent removal and analyte conversion device of the present system.

FIG. 1 shows the general configuration in one embodiment of a rotating disk, which effects the solvent removal and analyte conversion. In the Figure, a liquid sample is introduced 111 into the groove of the rotating [2] disk. The mobile phase from the sample is evaporated and directed to a vent line [3]. The non-volatile analytes are then exposed to a concentrated energy source [4] and converted into the gas phase for detection or reaction-detection [5]. Air or a suitable gas, such as oxygen, is supplied to the cell [6], which can be, and is preferably, pressurized and sealed.

Figure 2:
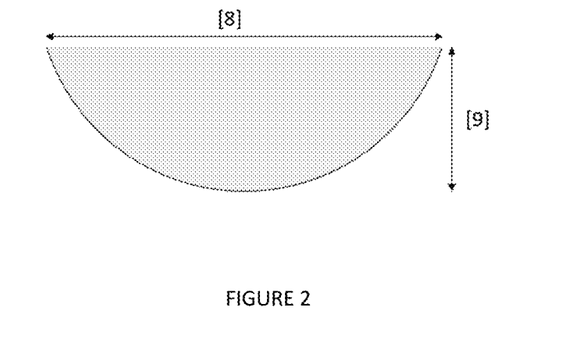
FIG. 2 shows the cross-section of a groove on the substrate surface of the device in FIG. 1.
Figure 3:
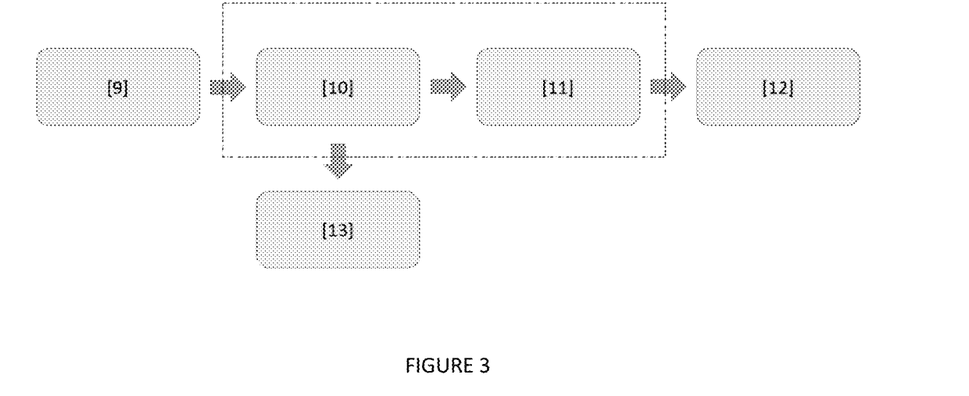
FIG. 3 shows a schematic of the major functions of the present system.

FIG. 2 illustrates the cross section of one embodiment of a groove on the substrate in which sample is deposited, non-volatile analytes remain after evaporation of the mobile phase, and non-volatile analytes are converted to the gas phase under the influence of a concentrated energy source. This all occurs upon rotation of the disk to the different stations as shown in FIG. 1. The width of the groove [8] is 3 mm and the depth of the groove [9] is 1 mm FIG. 3 summarizes the system's major functions, including introducing (U)HPLC effluent into the rotating disk device [9], mobile phase (solvent) removal [10], conversion of non-volatiles into the gas phase [11], detection with a suitable detector or secondary reaction followed by detection [12], and the venting or analysis of the evaporated volatile compounds [13].

Figure 4:
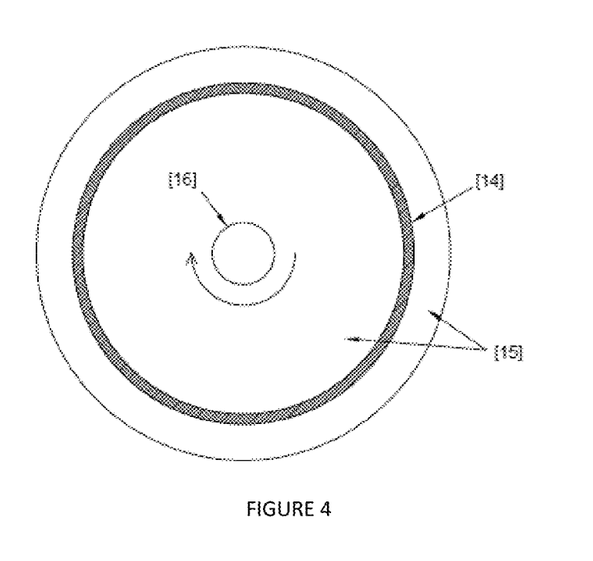
FIG. 4 shows a schematic of a rotating disk with its groove.

FIG. 4 shows a schematic of one embodiment of a disk where a groove [14] is contained in a disk with a polished surface [15]. The groove can be cut directly into the disk or can be an inlay of a different material such as alumina or quartz. The disk is rotated with a spindle that fits in a hole [16] in the center of the disk.

Figure 5:
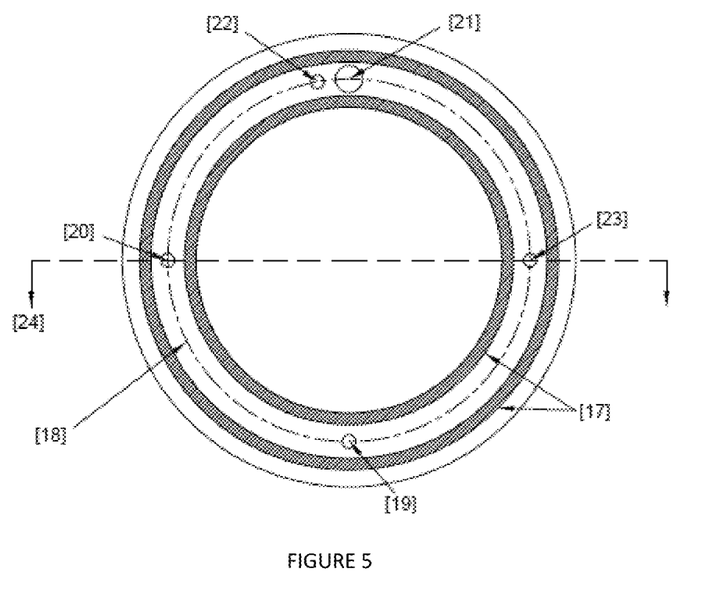
FIG. 5 shows an overhead view of the rotating disk, including the groove and various stations.

FIG. 5 shows a detailed overhead view of one embodiment of a disk. Seals [17] are positioned concentrically inside and outside of the groove [18]. The seals can be comprised of rubber or a suitable polymer. The seals can also employ spring energized components (FIG. 6) to supply a uniform force.

Effluent from a LC is fed into the system at the spray nozzle [19]. The mobile phase (solvent) is removed from the LC effluent and removed via the solvent vent [20]. Remaining non-volatile analytes are converted via a concentrated energy source located at [21], and the resulting gas is sent to the detector via the detector output [22]. A gas, such as air, is fed to the system at a position 90 degrees clockwise from the concentrated energy source [23]. A cross-section along the line defined by [24] is depicted in FIG. 6.

Figure 6:
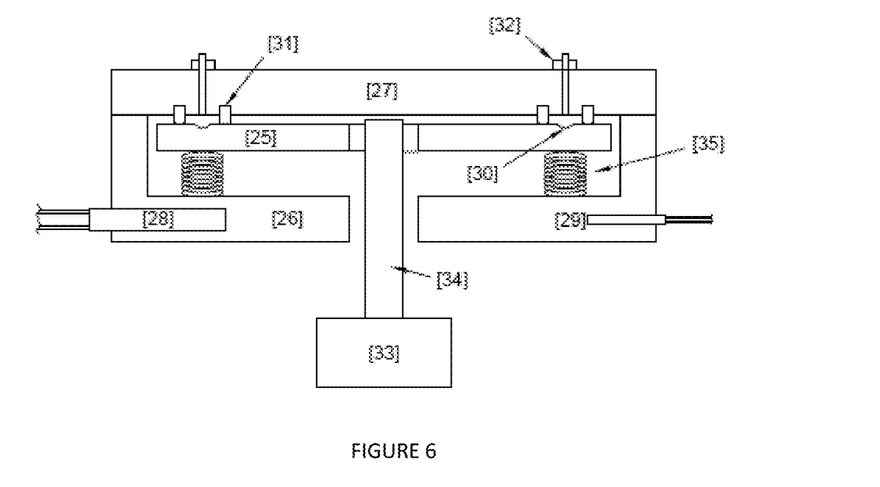
FIG. 6 shows a cross-sectional view of the rotating disk and one embodiment of sealing the rotating disk from the environment. The cross-section is taken along the cross-section line shown in FIG. 5.

FIG. 6 shows a cross-section taken along the line defined by [24] in FIG. 5, illustrating the sealing and rotating environment. The disk [25] is contained in a metal enclosure base [26] with a metal enclosure top [27]. In this configuration the solvents and analytes are only exposed to the disk and top. A heater cartridge [28] is inserted into the base at the position of the concentrated energy source, and the temperature is sensed, for example, with a resistance temperature detector (RTD) [29], also located in the base. The RTD can be positioned near the heater cartridge, or ideally 90 degrees counterclockwise from the heater. The groove [30] is positioned on the disk in between the two energized seals [31]. Fittings [32] built into the top directly above the groove facilitate the ingress and egress of molecules out of the device. The disk is rotated by a motor [33] coupled with a spindle [34]. The springs [35] supply a uniform force to effect sealing.

In one embodiment shown in FIG. 6, the device is a sealed chamber containing a rotating stainless steel disk heated to 120° C. and pressurized to 3 psig, controlled downstream with an electronic pressure controller. The disk contains a groove, ideally a parabola with a width of 3 mm and depth of 1 mm as shown in FIG. 2. Clean and dry air, or another gas, is supplied to a groove at one position, ideally positioned 90 degrees before the liquid spray site (see FIG. 1). The effluent from the liquid chromatograph is deposited into the groove on the disk and the solvent is evaporated while the disk rotates at a rate of 0.1 rpm to 5 rpm, ideally 0.5 rpm to 1 rpm. Evaporated solvent exits the cell via a vent into a solvent collection vessel. After solvent evaporation, the remaining non-volatile analytes are rotated into the path of a concentrated energy source, ideally a laser with a wavelength from 500-10,000 nm and a spot size of 4 mm. The concentrated energy source converts the analytes into the gas-phase.

Figure 7:
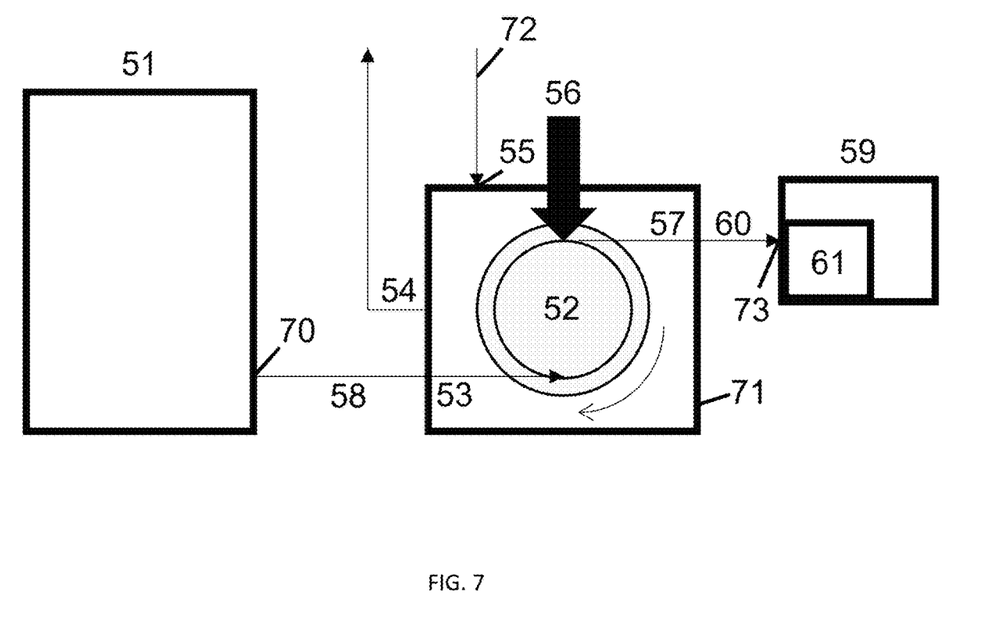
FIG. 7 depicts, in one embodiment, an entire system from liquid chromatograph to detector.

In one embodiment, FIG. 7 shows an entire system from liquid chromatograph to a detector. The present system is for the detection and quantification of organic molecules from a liquid chromatograph and comprises a liquid chromatograph [51] having an outlet [70] for effluent. A device [71] comprising a heated rotating disk [52], and inlet [53] for effluent from the liquid chromatograph with the inlet depositing the effluent onto the disk [52]. A solvent vent [54] for capturing volatilized gases, an inlet [55] for gases such as air or hydrogen provided via [72], a source of concentrated energy [56], and a vent [57] for receiving transformed analyte from action of the concentrated energy on the effluent deposited on the disk [52]. A conduit [58] connecting the outlet [70] of the chromatograph with the inlet [53] on the device [71] for receiving effluent from the chromatograph [51]. A detector [59] for detecting and quantifying organic molecules, the detector having an inlet [73] and a conduit [60] connecting the vent [57] in the device [71] for receiving transformed analyte to the inlet [73] of the detector. Optionally, the detector [59] is a flame ionization detector (FID). The FID can contain a catalytic oxidation and/or reduction reactor [61] to convert molecules to methane. When using an FID, this secondary reaction to methane improves the FID response.

In one embodiment, a laser provides the heat to combust the analytes into carbon dioxide. The converted non-volatiles are transferred to a reactor/detector system for analysis. In one embodiment converted compounds are subsequently converted catalytically to methane for FID detection. This conversion to methane occurs in a 3D-printed FID jet containing a metal catalyst. This embodiment has been shown to give a 1.9% RSD for repeat injections of 1011 ppm sucrose, an LOD of 0.5 nmol sucrose on column, and linearity over four orders of magnitude. Additionally, the response per mole of carbon was shown to be linear and equal for carbohydrates and peptides.

In another embodiment, concentrated light from a lightbulb provides the heat to combust the analytes into carbon dioxide. In another embodiment, a laser is pulsed to ablate the surface and transfer analytes into the gas phase. In another embodiment, electrical current is applied to locally heat and combust analytes to carbon dioxide. In another embodiment, analytes are pyrolyzed. In another embodiment a halogen bulb is focused with an ellipsoidal reflector onto the substrate and used as a concentrated energy source. In another embodiment, a plasma is directed at the surface to remove analytes from the surface of the substrate. In another embodiment, microwave energy is focused at the station to combust analytes.

In another embodiment, concentrated energy is provided by a hydrogen-air flame. Hydrogen and air are pre-mixed in a block fitting on the cell and ignited with a resistive wire positioned near the nozzle. The nozzle diameter can range from 0.1 mm ID to 1 mm ID, with air flow rates ranging from 50 mL/min to 500 mL/min and hydrogen flows ranging from 10 mL/min to 100 mL/min. Air is provided into the cell at a flow rate ranging from 50 mL/min to 500 mL/min to aid in combustion and solvent removal. In another embodiment, the hydrogen and air are mixed at the nozzle tip for the hydrogen-air flame energy source.

In another embodiment a catalyst is present on the surface of the rotating disk to speed and direct reactions. The catalyst may be comprised of Ru, Ni, Pd, Pt, Co, Rh, Fe, Ir, Cu, and/or other metals. This embodiment decreases the energy requirement for reaction from the concentrated energy source and decreases undesired side-reactions such as coke formation. In another embodiment the groove in the substrate is coated with an inorganic coating to enhance energy absorption and liquid deposition. In another embodiment the groove in the substrate is featured with ceramic beads to facilitate solvent vaporization and energy dispersion. In another embodiment the groove is made of high resistance material and a voltage is applied locally to heat and combust the analytes. In another embodiment the disk is made of quartz or alumina with an opaque finished groove surface condition.

In another embodiment, the pressure is controlled with an orifice or restrictor. In another embodiment, the pressure is controlled with a dome-loaded pressure regulator coupled with an electronic pressure regulator. In another embodiment, solvent is condensed in a pressurized condenser and vapors flow through a pressure controller, which may be electronically or manually operated.

In another embodiment the system uses infrared or ultraviolet detection to analyze the converted compounds. Converted compounds are analyzed directly after conversion or subsequently after additional catalytic reactions.

In another embodiment, the LC effluent is deposited on the edge of a rotating disk.

In another embodiment the groove contains an elevated pedestal on which the LC effluent is deposited, and the concentrated energy source is focused upon.

In another embodiment the substrate is static, and the concentrated energy source is translated across the surface to convert the deposited analytes.

In one embodiment the vaporized effluent containing solvent and volatile analytes are transferred to a detector system. In one embodiment this detector system comprises a chromatographic column/tube containing an active phase that adsorbs and separates molecules based on their boiling point and/or affinity to the active phase. The solvent passes through the column relatively unrestrained, while analytes are retained on the column. A valve is used to pulse or divert analytes to another column so that adsorbed analytes can be desorbed for analysis. The retained analytes are then qualitatively or quantitatively detected with a suitable detector. These detectors may include a mass spectrometer, ultraviolet, infrared, or flame ionization detector. Secondary catalytic reaction to methane before FID detection can be used to provide a universal response.

While the foregoing written description of the invention enables one of ordinary skill to make and use what is considered presently to be the best mode thereof, those of ordinary skill will understand and appreciate the existence of variants, combinations, and equivalents of the specific embodiment, method, and examples herein. The invention should therefore not be limited by the above described embodiment, method, and examples, but by all embodiments and methods within the scope and spirit of the invention.

That which is claimed is:

1. A system for the detection and quantification of organic molecules from a liquid chromatograph comprising:
    a liquid chromatograph having an outlet;
    a device comprising a heated rotating disk with the inlet from the liquid chromatograph with the inlet situated to deposit the effluent onto a disk substrate at a location away from an edge of a disk substrate, a solvent vent for capturing volatilized gases, an inlet for a gas, a source of concentrated energy, and a vent for receiving transformed analyte from the action of the concentrated energy;
    a conduit connecting the outlet of the chromatograph with the inlet on the device for receiving effluent from the chromatograph;
    a detector for detecting and quantifying organic molecules, the detector having an inlet; and
    a conduit connecting the vent in the device for receiving transformed analyte to the inlet of the detector,
    wherein the detector is an FID detector and contains a reactor that catalytically oxidizes and/or reduces the transformed analyte.

2. The system of claim 1, wherein the rotating disk comprises a circular groove with the inlet depositing the effluent into the groove.

3. The system of claim 1, wherein the device comprises a resistive heater.

4. The system of claim 1, wherein the device is a sealed device.

5. The system of claim 4, wherein the device is under pressure.

6. The system of claim 4, wherein the device is a sealed device that has been sealed with rubber and/or polymer seals.

7. The system of claim 1, wherein the source of concentrated energy comprises a laser, electrical source, microwave source, plasma source, or concentrated light source.

8. The system of claim 1, wherein the surface of the disk comprises a catalyst.

9. A method for the detection and quantification of organic molecules from a liquid chromatograph, comprising:
    providing an effluent from a liquid chromatograph;
    depositing the effluent on a substrate of a heated rotating disk at a location away from an edge of the disk;
    volatilizing gases from the effluent and leaving behind non-volatilized analytes;
    moving the analytes on the disk by rotation to a station comprising a source of concentrated energy which acts on the analytes to convert the analytes to a detectable form; and
    passing converted analytes to a detector for detection and quantification,
    wherein the detector is an FID detector and contains a reactor that catalytically oxidizes and/or reduces the converted analytes.

10. The method of claim 9, wherein the effluent is deposited into a groove in the heated rotating disk.

11. The method of claim 9, wherein the converted analytes are passed to a reactor for reaction prior to detection.

12. The method of claim 11, wherein the reactor catalytically oxidizes and/or reduces the converted analyte.

13. The method of claim 9, wherein the source of concentrated energy comprises a laser, electrical source, microwave source, plasma source, or concentrated light source.

14. A device for removing volatile gases from a liquid to obtain a non-volatile portion, and transforming the non-volatile portion, comprising:
    a heated rotating disk, an inlet for the liquid with the inlet depositing the liquid onto a substrate of the disk at a location away from an edge of the disk, a vent for capturing volatilized gases, an inlet for gases, and a source of concentrated energy for transforming the non-volatile portion,
    wherein the detector is an FID detector and contains a reactor that catalytically oxidizes and/or reduces the transformed portion.

15. The device of claim 14, wherein the rotating disk has a groove for receiving the liquid.

16. The device of claim 14, wherein the device is a sealed device.

17. The device of claim 16, wherein the device is under pressure.

\* \* \* \* \*